United States Patent
Kumaki et al.

(10) Patent No.: US 6,792,006 B1
(45) Date of Patent: Sep. 14, 2004

(54) DATA MULTIPLEXING DEVICE MULTIPLEXING TRANSPORT STREAM GENERATED FROM ENCODED DATA

(75) Inventors: Satoshi Kumaki, Hyogo (JP); Tetsuya Matsumura, Hyogo (JP); Hiroshi Segawa, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 799 days.

(21) Appl. No.: 09/604,006

(22) Filed: Jun. 26, 2000

(30) Foreign Application Priority Data

Dec. 24, 1999  (JP) ............................................ 11-366557

(51) Int. Cl.[7] ................................................ H04J 3/02
(52) U.S. Cl. ..................................... 370/537; 370/363
(58) Field of Search ............................... 370/363, 368, 370/371, 374, 378, 381, 389, 392, 395.64, 395.7, 428, 537, 540

(56) References Cited

U.S. PATENT DOCUMENTS 5,481,543 A * 1/1996 Veltman ..................... 370/94.1

FOREIGN PATENT DOCUMENTS

| JP | 4-196654 | 7/1992 |
| JP | 4-363925 | 12/1992 |
| JP | 6-261016 | 9/1994 |
| JP | 8-125629 | 5/1996 |

* cited by examiner

Primary Examiner—Wellington Chin
Assistant Examiner—Brenda Pham
(74) Attorney, Agent, or Firm—McDermott Will & Emery LLP (57) ABSTRACT

The data multiplexing device includes a header information memory storing header information, ES buffers holding encoded data of a plurality of media, an output buffer holding packetized data, and a transfer controlling unit controlling a transfer of the header information stored in the header information memory and the encoded data held in the ES buffers and writing into the output buffer as the packetized data. The transfer controlling unit can generate the packetized data simply by controlling the transfer of the header information stored in the header information memory and the encoded data held in the ES buffers, whereby the media multiplexing can be readily achieved.

15 Claims, 14 Drawing Sheets

| NAME OF REGISTERS | CONTENT |
|---|---|
| TRANSFER STARTING REGISTER | WITH "1" BEING SET, START THE TRANSFER OF SET MEDIA. WHEN THE TRANSFER TO THE OUTPUT BUFFER IS COMPLETED, THE BIT FIELD IS RESET BY HARDWARE. WHEN "1" IS WRITTEN INTO AN OBJECT BIT FIELD, THE BIT IS SET TO "1" AND WHEN "0" IS WRITTEN INTO, A SET VALUE IS HELD. BIT 2 FOR DATA BIT 1 FOR AUDIO BIT 0 FOR VIDEO |
| ELEMENT-BASED MULTIPLEXING REGISTER FOR DATA | INDICATING AN ELEMENT TO BE MULTIPLEXED. PERFORM THE MULTIPLEXING OF DATA IN A BIT FIELD SET TO "1". EACH DATA IS READ FROM AN ADDRESS SET IN THE TRANSFER REGISTER. BIT 2 HEADER MEMORY 0 BIT 1 HEADER MEMORY 1 BIT 0 ES BUFFER |
| HEADER MEMORY 0 TRANSFER REGISTER FOR DATA | BITS 21~11 READ START ADDRESS BITS 10~0 READ END ADDRESS |
| HEADER MEMORY 1 TRANSFER REGISTER FOR DATA | BITS 21~11 READ START ADDRESS BITS 10~0 READ END ADDRESS |
| ES BUFFER TRANSFER REGISTER FOR DATA | BITS 21~11 READ START ADDRESS BITS 10~0 READ END ADDRESS |
| ELEMENT-BASED MULTIPLEXING REGISTER FOR AUDIO | BIT FIELD IS SAME WITH THE ELEMENT-BASED MULTIPLEXING REGISTER FOR DATA |
| HEADER MEMORY 0 TRANSFER REGISTER FOR AUDIO | BIT FIELD IS SAME WITH HEADER MEMORY 0 TRANSFER REGISTER FOR DATA |
| HEADER MEMORY 1 TRANSFER REGISTER FOR AUDIO | BIT FIELD IS SAME WITH HEADER MEMORY 1 TRANSFER REGISTER FOR DATA |
| ES BUFFER TRANSFER REGISTER FOR AUDIO | BIT FIELD IS SAME WITH ES BUFFER TRANSFER REGISTER FOR DATA |
| ELEMENT-BASED MULTIPLEXING REGISTER FOR VIDEO | BIT FIELD IS SAME WITH ELEMENT-BASED MULTIPLEXING REGISTER FOR DATA |
| HEADER MEMORY 0 TRANSFER REGISTER FOR VIDEO | BIT FIELD IS SAME WITH HEADER MEMORY 0 TRANSFER REGISTER FOR DATA |
| HEADER MEMORY 1 TRANSFER REGISTER FOR VIDEO | BIT FIELD IS SAME WITH HEADER MEMORY 1 TRANSFER REGISTER FOR DATA |
| ES BUFFER TRANSFER REGISTER FOR VIDEO | BIT FIELD IS SAME WITH ES BUFFER TRANSFER REGISTER FOR DATA |

| NAME OF REGISTERS | CONTENT |
|---|---|
| TRANSFER STARTING REGISTER | WITH "1" BEING SET, START THE TRANSFER OF SET MEDIA. WHEN THE TRANSFER TO THE OUTPUT BUFFER IS COMPLETED, THE BIT FIELD IS RESET BY HARDWARE. WHEN "1" IS WRITTEN INTO AN OBJECT BIT FIELD, THE BIT IS SET TO "1" AND WHEN "0" IS WRITTEN INTO, A SET VALUE IS HELD.<br>BIT 2 FOR DATA<br>BIT 1 FOR AUDIO<br>BIT 0 FOR VIDEO |
| ELEMENT-BASED MULTIPLEXING REGISTER FOR DATA | INDICATING AN ELEMENT TO BE MULTIPLEXED. PERFORM THE MULTIPLEXING OF DATA IN A BIT FIELD SET TO "1". EACH DATA IS READ FROM AN ADDRESS SET IN THE TRANSFER REGISTER.<br>BIT 2 HEADER MEMORY 0<br>BIT 1 HEADER MEMORY 1<br>BIT 0 ES BUFFER |
| HEADER MEMORY 0 TRANSFER REGISTER FOR DATA | BIT 24 PCR<br>BIT 23 ENDING FLAG<br>BIT 22 LEADING FLAG<br>BITS 21~11 READ START ADDRESS<br>BITS 10~0 READ END ADDRESS |
| HEADER MEMORY 1 TRANSFER REGISTER FOR DATA | BIT 23 ENDING FLAG<br>BIT 22 LEADING FLAG<br>BITS 21~11 READ START ADDRESS<br>BITS 10~0 READ END ADDRESS |
| ES BUFFER TRANSFER REGISTER FOR DATA | BIT 23 ENDING FLAG<br>BIT 22 LEADING FLAG<br>BITS 21~11 READ START ADDRESS<br>BITS 10~0 READ END ADDRESS |
| ELEMENT-BASED MULTIPLEXING REGISTER FOR AUDIO | BIT FIELD IS SAME WITH THE ELEMENT-BASED MULTIPLEXING REGISTER FOR DATA |
| HEADER MEMORY 0 TRANSFER REGISTER FOR AUDIO | BIT FIELD IS SAME WITH HEADER MEMORY 0 TRANSFER REGISTER FOR DATA |
| HEADER MEMORY 1 TRANSFER REGISTER FOR AUDIO | BIT FIELD IS SAME WITH HEADER MEMORY 1 TRANSFER REGISTER FOR DATA |
| ES BUFFER TRANSFER REGISTER FOR AUDIO | BIT FIELD IS SAME WITH ES BUFFER TRANSFER REGISTER FOR DATA |
| ELEMENT-BASED MULTIPLEXING REGISTER FOR VIDEO | BIT FIELD IS SAME WITH ELEMENT-BASED MULTIPLEXING REGISTER FOR DATA |
| HEADER MEMORY 0 TRANSFER REGISTER FOR VIDEO | BIT FIELD IS SAME WITH HEADER MEMORY 0 TRANSFER REGISTER FOR DATA |
| HEADER MEMORY 1 TRANSFER REGISTER FOR VIDEO | BIT FIELD IS SAME WITH HEADER MEMORY 1 TRANSFER REGISTER FOR DATA |
| ES BUFFER TRANSFER REGISTER FOR VIDEO | BIT FIELD IS SAME WITH ES BUFFER TRANSFER REGISTER FOR DATA |

DATA MULTIPLEXING DEVICE MULTIPLEXING TRANSPORT STREAM GENERATED FROM ENCODED DATA

BACKGROUND OF THE INVENTION

1. Field of the Invention

The present invention relates to techniques for multiplexing encoded data of video, audio and data. More particularly, the present invention relates to data multiplexing devices multiplexing TS's (Transport Streams) generated from encoded data of video, audio and data.

2. Description of the Background Art

Recently, researches of multimedia technologies have been vigorously conducted in various fields. Among them, the development of data multiplexing devices multiplexing encoded data of various media is particularly important. Hereinafter, a TS generator of MPEG (Moving Picture Experts Group) hereinafter referred to as MPEG2TS generator) will be described as an example of the data multiplexing devices. The MPEG2TS generator receives encoded data called an ES (Elementary Stream) generated by an encoding circuit as an input. The MPEG2TS generator multiplexes ES's of video, audio and data in a time divisional manner, thereby generates one data stream.

Figure 1:
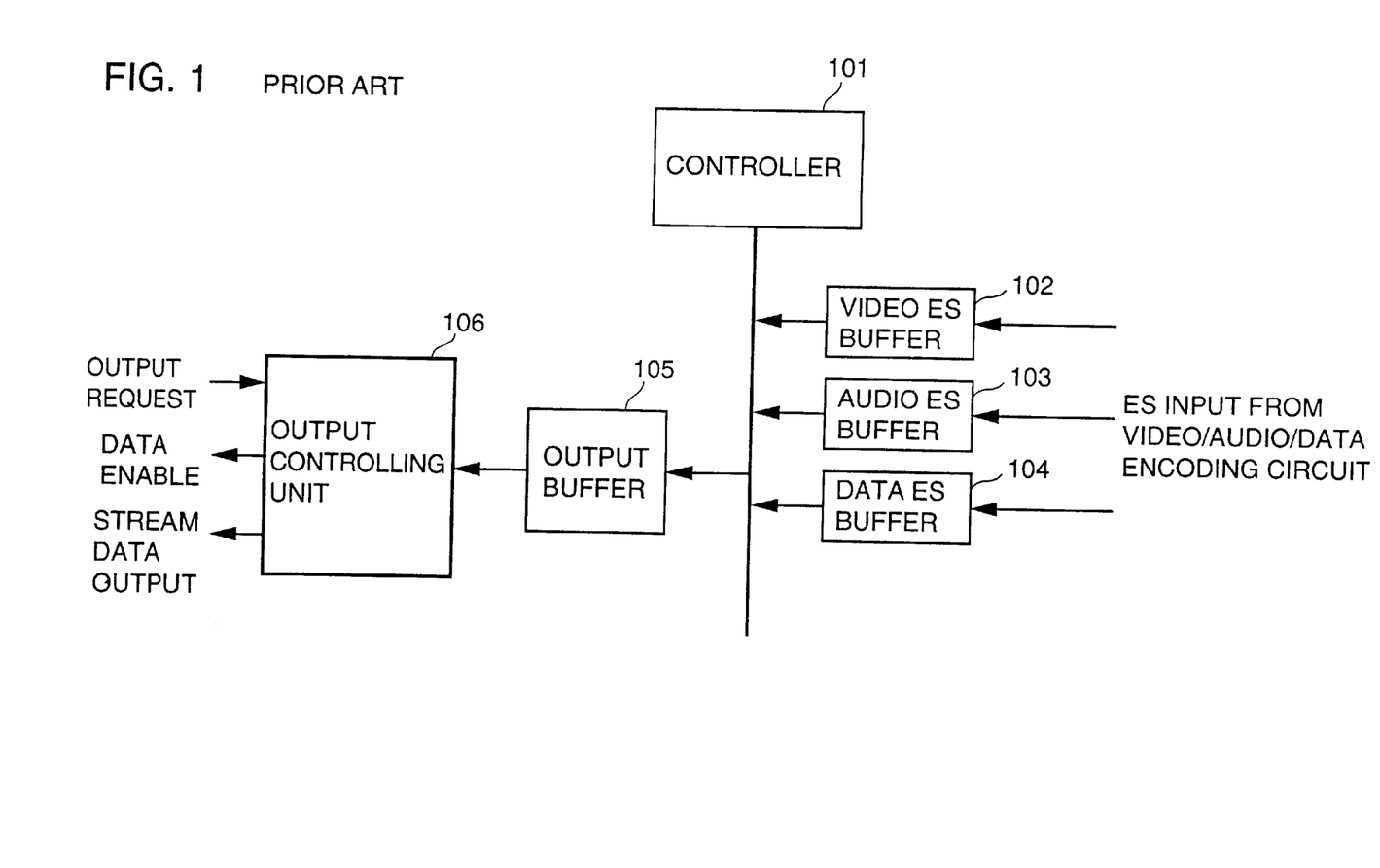
FIG. 1 is a block diagram showing a schematic structure of a conventional MPEG2TS generator.

FIG. 1 is a block diagram showing a schematic structure of a conventional MPEG2TS generator. The MPEG2TS generator includes a controller 101 controlling the MPEG2TS generator as a whole, a video ES buffer 102 buffering a video ES generated by an encoding circuit not shown, an audio ES buffer 103 buffering an audio ES generated by the encoding circuit, a data ES buffer 104 buffering a data ES generated by the encoding circuit, an output buffer 105 to which packetized video ES, audio ES and data ES are respectively written, and an output control unit 106 controlling an output of a TS packet buffered in output buffer 105 according to an external output request.

Figure 2:
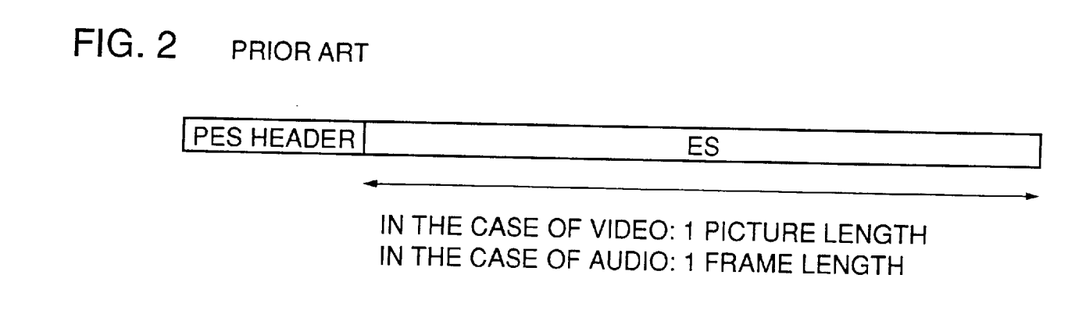
FIG. 2 is a diagram showing a structure of an ES before TS generation.

The TS must be generated in a format including appended header information on a picture basis in the case of the video and on a frame basis in the case of audio. Therefore, before the generation of the TS, the processing into a PES (Packetized ES) format including appended header information is required on the picture basis in the case of the video ES and on the frame basis in the case of the audio ES as shown in FIG. 2.

Figure 3A:
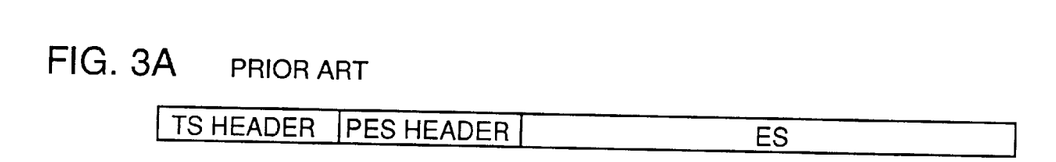
FIGS. 3A and 3B are referenced for describing a structure of a TS.
Figure 3B:
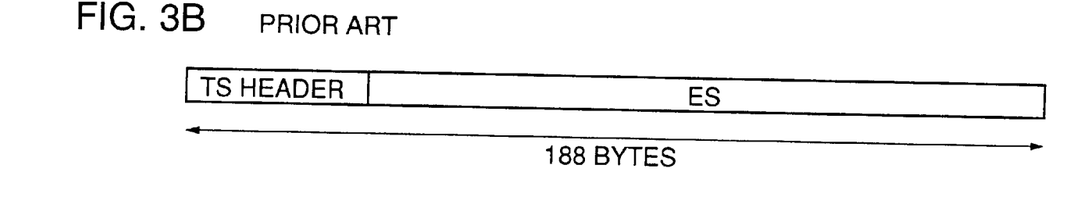

The TS is constituted from a group of packets of a fixed length, each packet storing an ES of media of one type. As shown in FIGS. 3A and 3B, the TS is constituted of the header information and the PES. One packet length of the TS is fixed to 188 bytes. As the data length of the PES is usually longer than the one packet length, one PES is divided into a plurality of TS packets. Hence, as shown in FIG. 3A, a TS packet including a head of a PES stores TS header information, PES header information and a part of an ES. Other TS packets store TS header information and the other part of the ES as shown in FIG. 3B.

In the MPEG2TS generator as shown in FIG. 1, controller 101 reads out respective ES's from video ES buffer 102, audio ES buffer 103 and data ES buffer 104, and writes them sequentially into output buffer 105 after the generation of header information and the TS packetization. Output control unit 106 reads out the TS from output buffer 105 and supplies the TS as an output according to the external output request.

When the rate of TS generation by controller 101 differs from the rate of TS output from output control unit 106, the amount of output data at output control unit 106 may exceed or fall short of the required amount. Though the structure is usually made such that a total sum of an encoding rate does not exceed a total sum of an output rate, the total sum of the encoding rate can be lower than the total sum of the output rate. In such a case, the encoding rate is matched with the output rate through the deliberate insertion of a dummy packet called "null packet" by controller 101. This matching is performed by controller 101 writing a "null packet" into output buffer 105.

In the conventional MPEG2TS generator, however, as a detection of a picture boundary of the video ES and a frame boundary of the audio ES is required for the generation of PES, controller 101 analyzes each ES and extracts boundary information thereof. Therefore, ES analyzing means which is originally unnecessary is required.

In addition, as controller 101 needs control information at the time of encoding for the generation of the header information of the PES, the separate input of control information in addition to the ES is required from the encoding circuit. Still further, for the matching of the generation rate of the TS and the output rate of the TS, controller 101 must monitor an output state of the TS, generate and insert a "null packet" if necessary in order to prevent the shortage of TS.

SUMMARY OF THE INVENTION

An object of the present invention is to provide a data multiplexing device capable of performing a control in a simple manner at the time of TS multiplexing.

Another object of the present invention is to provide a data multiplexing device capable of outputting a multiplexed TS packet at a fixed rate according to an external output request.

Still another object of the present invention is to provide a data multiplexing device capable of externally notifying a data boundary of multiplexed data.

According to one aspect of the present invention, a data multiplexing device includes a storing unit storing header information; a first holding unit holding encoded data of a plurality of media; a second holding unit holding packetized data; and a transfer controlling unit controlling a transfer of the header information stored in the storing unit and the encoded data held in the first holding unit and writing into the second holding unit as the packetized data.

As the transfer controlling unit can generate packetized data simply by controlling the transfer of the header information stored in the storing unit and the encoded data held by the first holding unit, media multiplexing can be easily performed.

Preferably, The data multiplexing device further includes an output controlling unit externally outputting data of a predetermined amount from the second holding unit according to an external transfer request.

As the output controlling unit supplies data of a predetermined amount as an output from the second holding unit according to the external transfer request, media multiplexed data can be supplied as an output at an externally requested rate.

Still preferably, the data multiplexing device further includes a flag appending unit appending a flag to data held by the second holding unit in an optional position, wherein the second holding unit externally outputs flag information in synchronization with packetized data.

As the second holding unit externally supplies the flag information as an output in synchronization with the packetized data, any position (data boundary) of the packetized data can be externally identified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is referenced for describing contents of respective registers provided inside a transfer controlling unit 6;

FIG. 10 is referenced for describing contents of respective registers provided inside a transfer controlling unit 6';

DESCRIPTION OF THE PREFERRED EMBODIMENTS

First Embodiment

Figure 4:
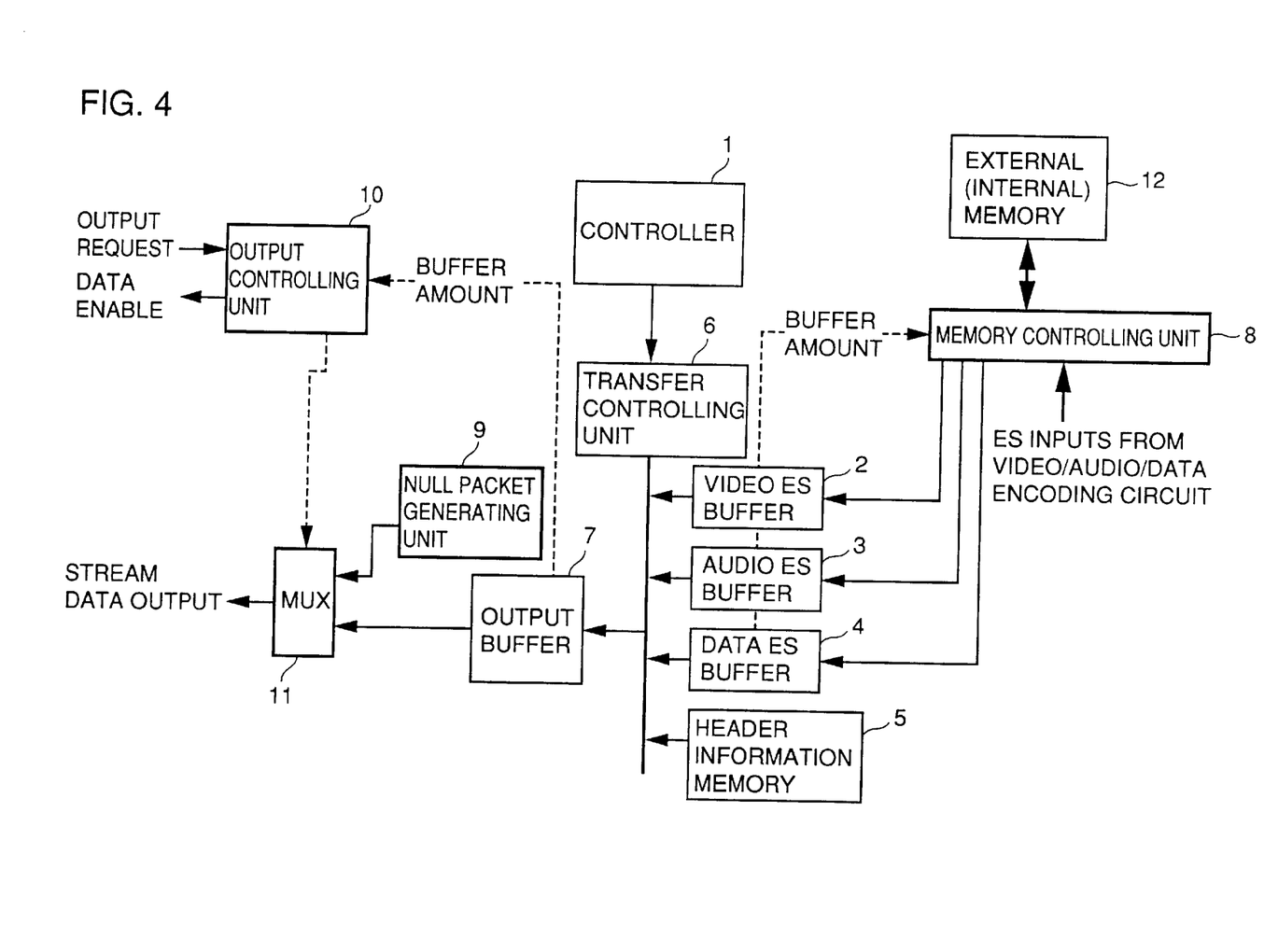
FIG. 4 is a block diagram showing a schematic structure of a data multiplexing device according to the first embodiment of the present invention.

FIG. 4 is a block diagram showing a schematic structure of a data multiplexing device according to the first embodiment of the present invention. The data multiplexing data includes a controller 1 controlling the data multiplexing device as a whole, a video ES buffer 2 buffering a video ES, an audio ES buffer 3 buffering an audio ES, a data ES buffer 4 buffering a data ES, a header information memory 5 storing header information, a transfer controlling unit 6 controlling a transfer of the header information and each ES data, an output buffer 7 buffering the header information and each ES data, a memory controlling unit 8 transferring the video ES, the audio ES and the data ES output from an encoding circuit not shown in a time divisional manner, a null packet generating unit 9 generating a null packet, an output controlling unit 10 performing an output control of a packet according to an external output request, a multiplexer (MUX) 11 selectively supplying a TS packet and a null packet as outputs according to the control by output controlling unit 10 and an external (internal) memory 12.

Memory controlling unit 8 receives the video ES, the audio ES and the data ES supplied from the encoding circuit not shown as inputs and supplies them to video ES buffer 2, audio ES buffer 3 or data ES buffer 4 in a time divisional manner. Memory controlling unit 8 has a register holding a maximum transfer amount per a unit time for each ES and performs a data transfer such that the amount of transfer would not exceed the maximum transfer amount designated in the register and that the overflow would not be caused by referring to a free capacity in video ES buffer 2, audio ES buffer 3 and data ES buffer 4. During the data transfer, external (internal) memory 12 is used if necessary.

Transfer controlling unit 6 reads header information from header information memory 5, the video ES from video ES buffer 2, the audio ES from audio ES buffer 3, the data ES from data ES buffer 4 and writes them into output buffer 7 according to an internal register setting. Here, it is assumed that the header information to be used at the time of multiplexing is previously written into or written at the time of multiplexing into header information memory 5.

FIG. 5 is referenced for describing contents of respective registers provided in transfer controlling unit 6. A transfer starting register is a register for controlling the starting of data transfer from header information memory 5, video ES buffer 2, audio ES buffer 3 or data ES buffer 4 to output buffer 7. Bits 2~0 are assigned for the data transfer, the audio transfer and the video transfer, respectively. When the bit field is set to "1", the transfer of header information and ES data of media corresponding to the bit is started. Upon completion of the data transfer to output buffer 7, the bit field is reset to "0". Here, when "1" is written into a bit field, the bit field is set to "1" and when "0" is written into, a value already set is held.

An element-based multiplexing register for data is a register for setting an element to be multiplexed. Bits 2~0 are assigned for header memory 0, header memory 1 and data ES buffer 4, respectively, and when the bit field is set to "1", the multiplexing of the header information or the ES data corresponding to the bit is performed. Header memory 0 and header memory 1 correspond to the TS header and PES header, respectively.

A header memory 0 transfer register for data is a register for reading the header information for data ES. Bits 21~11 are assigned for a read start address and bits 10~0 are assigned for a read end address.

A header memory 1 transfer register for data is a register for reading the header information for data ES. Bits 21~11 are assigned for a read start address and bits 10~0 are assigned for a read end address.

An ES buffer transfer register for data is a register for reading data ES. Bits 21~11 are assigned for a read start address and bits 10~0 are assigned for a read end address.

The contents of an element-based multiplexing register for audio, a header memory 0 transfer register for audio, a header memory 1 transfer register for audio and an ES buffer transfer register for audio are same with the contents of the element-based multiplexing register for data, the header memory 0 transfer register for data, the header memory 1 transfer register for data and the ES buffer transfer register for data, respectively. In addition, the contents of an element-based multiplexing register for video, a header memory 0 transfer register for video, a header memory 1 transfer register for video and an ES buffer transfer register for video are same with the contents of the element-based multiplexing register for data, the header memory 0 transfer register for data, the header memory 1 transfer register for data and the ES buffer transfer register for data, respectively.

The values in the registers in transfer controlling unit 6 described above are set by controller 1 as required. When the transfer of the header information or the ES data is started by the transfer starting register, transfer controlling unit 6 reads out data from ES buffers 2~4 or header information memory 5 and writes into output buffer 7. At this time, if output buffer 7 reaches a full state, the transfer operation is suspended and after the state of output buffer 7 changes from the full state, the data transfer is resumed. Here, controller 1 can refer to the registers for a write address, a read address and filled amount of each of ES buffers 2~4.

Next, an operation of media multiplexing will be described. Controller 1 sets data in registers (each corresponding to media of data to be transferred) other than the transfer starting register, and then sets the bit field of the transfer starting register corresponding to media to be transferred to "1". When either of the bit field of the transfer starting register is set to "1", transfer controlling unit 6 starts the data transfer of the media corresponding to the bit field.

First, transfer controlling unit 6 evaluates the header memory 0 field of the element-based multiplexing register. If "1" is set, transfer controlling unit 6 reads the header information from header information memory 5 and transfers to output buffer 7. Here, transfer controlling unit 6 starts the transfer from a read start address set in the header memory 0 transfer register and continues the transfer up to a read end address set in the header memory 0 transfer register. If transfer controlling unit 6 evaluates and finds the header memory 0 field set to "0", transfer controlling unit 6 moves to an evaluation of the next bit field without performing the transfer.

Next, transfer controlling unit 6 evaluates the header memory 1 field of the element-based multiplexing register. If "1" is set, transfer controlling unit 6 reads the header information from header information memory 5 and transfers to output buffer 7. Here, transfer controlling unit 6 starts the transfer from a read start address set in the header memory 1 transfer register and continues the transfer up to a read end address set in the header memory 1 transfer register. If transfer controlling unit 6 evaluates and finds the header memory 1 field set to "0", transfer controlling unit 6 moves onto an evaluation of the next bit field without performing the transfer.

Finally, transfer controlling unit 6 evaluates the ES buffer field of the element-based multiplexing register. If "1" is set, transfer controlling unit 6 reads the ES data from one of ES buffers 2~4 and transfers to output buffer 7. Here, transfer controlling unit 6 starts the transfer from a read start address set in the ES buffer transfer register and continues the transfer up to a read end address set in the ES buffer transfer register. After the completion of the transfer, a corresponding bit field in the transfer starting register is reset to "0".

After setting a value in the transfer starting register, controller 1 can detect a transfer operation state of transfer controlling unit 6 by monitoring the transfer starting register. When controller 1 sets a plurality of bit field of the transfer starting register to "1", the data transfer of each media is performed in a predetermined order.

Figure 6:
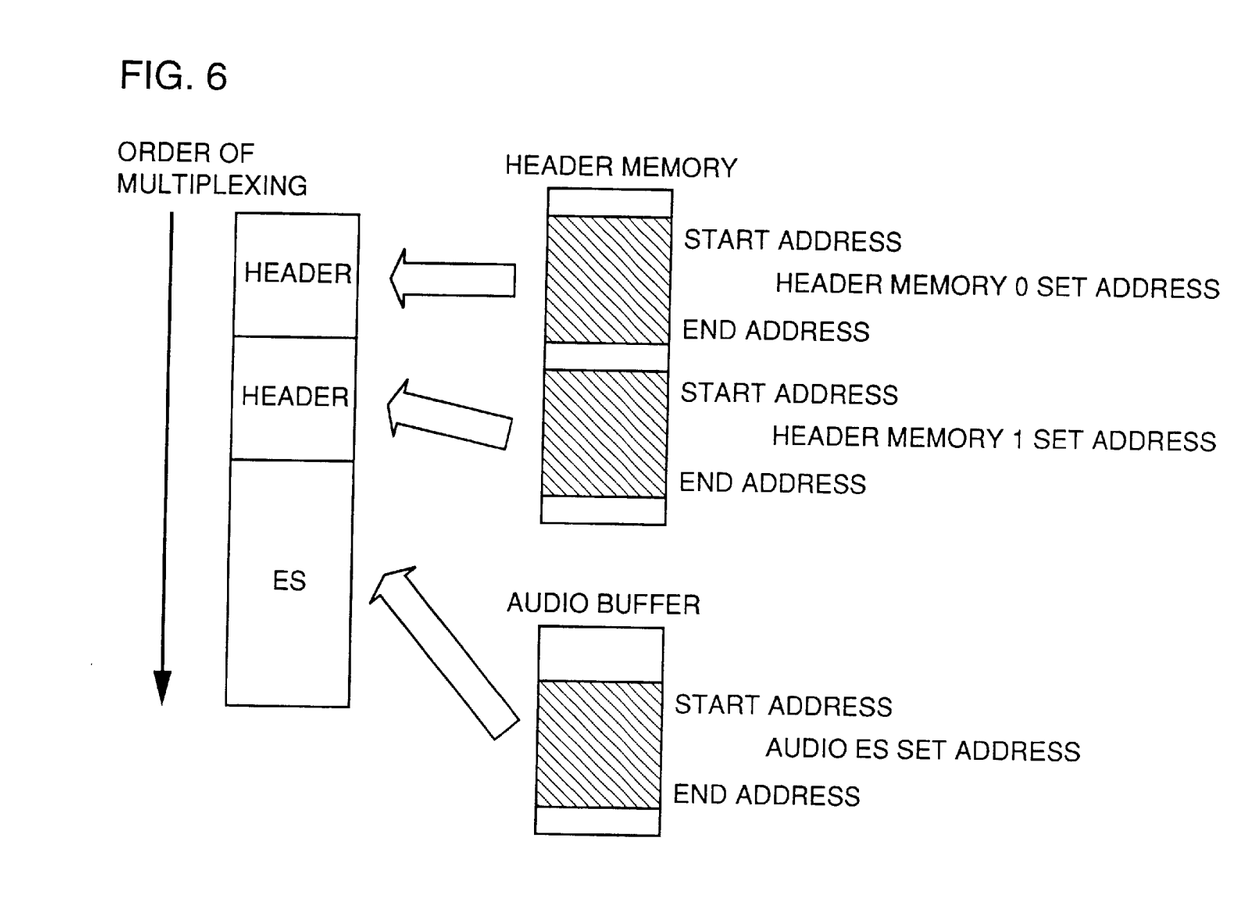
FIG. 6 is a diagram showing an example of a transfer of header information and an audio ES.

FIG. 6 is a diagram showing an example of the transfer of the header information and the audio ES. As shown in FIG. 6, the transfer of the header information from header information memory 5 to output buffer 7 is performed starting from a read start address set in the header memory 0 transfer register for audio up to a read end address. Then, the transfer of the header information from header information memory 5 to output buffer 7 is performed starting from a read start address set in the header memory 1 transfer register for audio up to a read end address. Then, the transfer of the ES data from audio ES buffer 3 to output buffer 7 is performed starting from a read start address set in the ES buffer transfer register for audio up to a read end address.

Figure 7:
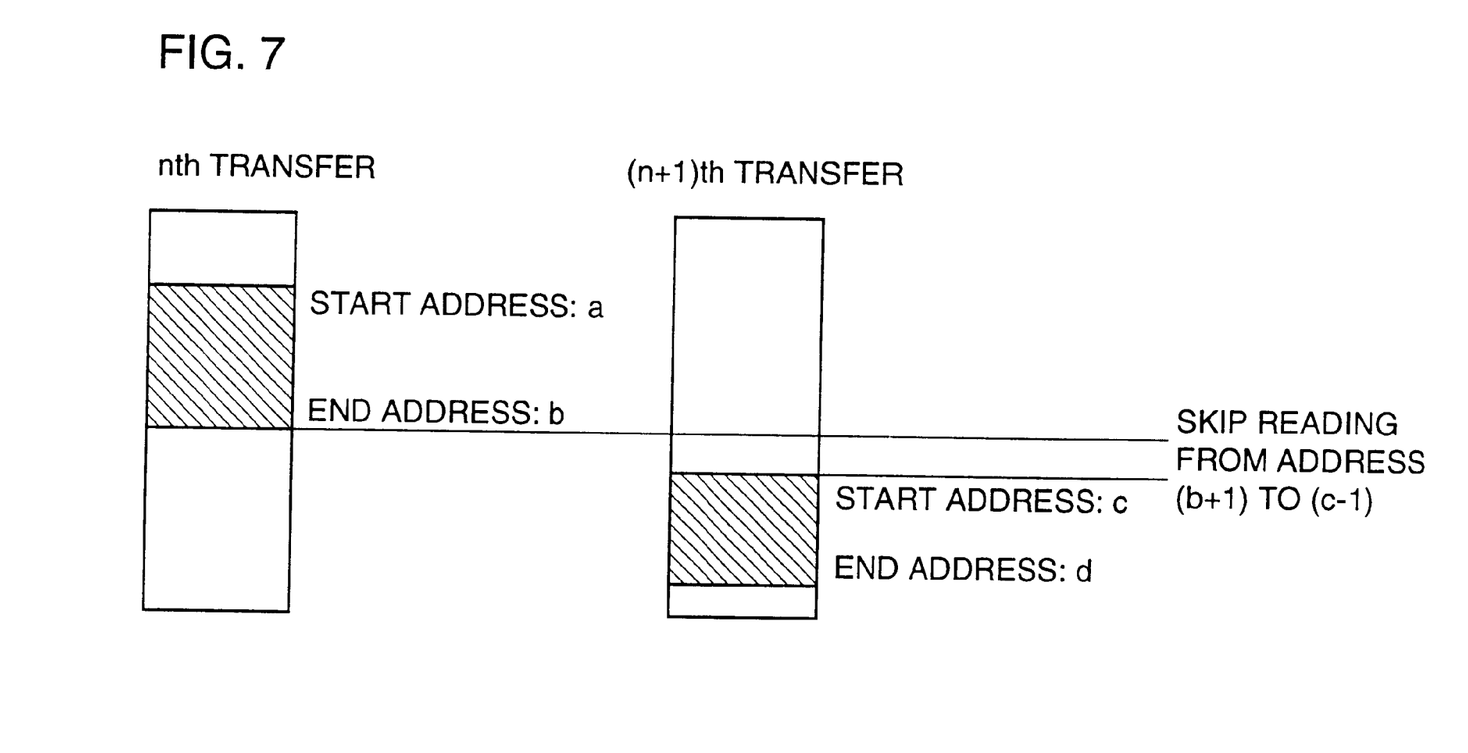
FIG. 7 is referenced for describing a case in which a transfer from ES buffers 2~4 to an output buffer 7 is discontinuous.

FIG. 7 is a diagram referenced for describing a case in which the transfer from ES buffers 2~4 to output buffer 7 is discontinuous. A write pointer of each of ES buffers 2~4 is updated by ES data writing by memory controlling unit 8. A read pointer of each of ES buffers 2~4 is updated by the data transfer by transfer controlling unit 6. Transfer controlling unit 6 performs the transfer while referring to the read start address and the read end address set in the ES buffer transfer register. Hence, an nth read end address b and (n+1)th read start address c become discontinuous as shown in FIG. 7, and data from address (b+1) to (c−1) may be skipped in the reading.

Output controlling unit 10 have a register inside and the number of data to be continuously output is previously set. On receiving an external output request, output controlling unit 10 refers to the state of output buffer 7. When data of the continuous output number exists in output buffer 7, output controlling unit 10 makes data held in output buffer 7 output via MUX 11. If the data of the continues output number does not exist in output buffer 7, output controlling unit 10 makes a "null packet" output from null packet generating unit 9 via MUX 11. As the data structure of the "null packet" is predetermined, the data structure is previously held in null packet generating unit 9 and output controlling unit 10 makes null packet generating unit 9 output the "null packet" when necessary.

Figure 8:
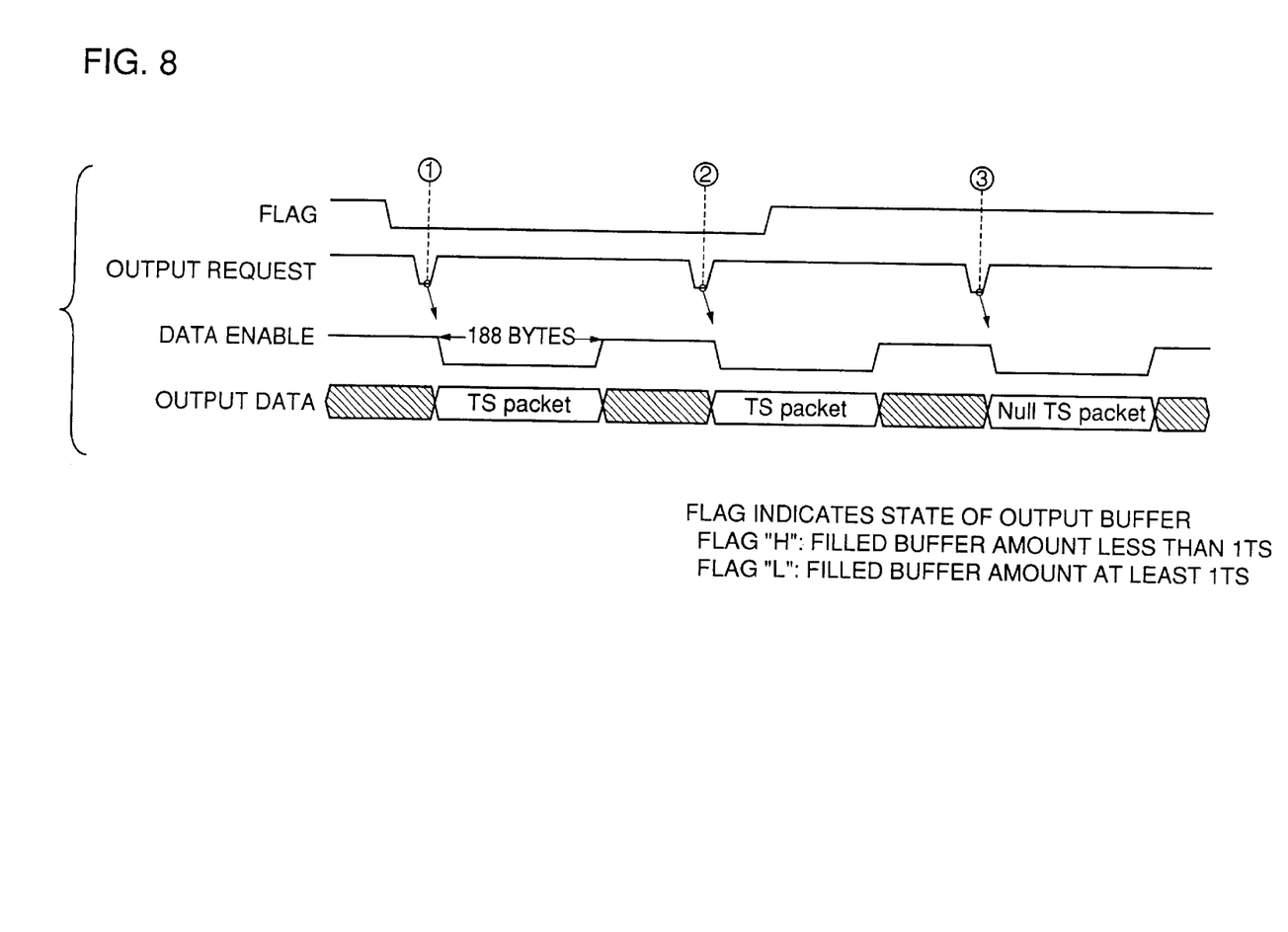
FIG. 8 is a timing chart of an output controlling unit 10.

FIG. 8 is a timing chart of output controlling unit 10. A FLAG signal of a low level indicates that the data of the continues output number exists in output buffer 7 whereas a FLAG signal of a high level indicates that the data of the continuos output number do not exist in output buffer 7. On receiving an external output request at the timing of 1̂ and 2̂ shown in FIG. 8, output controlling unit 10 lets output buffer 7 output data (TS packet) of 188 bytes as the FLAG signal is at a low level. If output controlling unit 10 receives an external output request at the timing of 3̂, output controlling unit 10 lets null packet generating unit 9 output a "null packet" as the FLAG signal is at a high level. While supplying the TS packet or the "null packet" as an output, output controlling unit 10 supplies a data enable signal of a low level.

With the data multiplexing device according to the first embodiment, as the maximum transfer amount per a unit time is set in the internal register of memory controlling unit 8 as described above, the control can be readily performed at the time of TS multiplexing. Each ES is encoded at a rate determined at the time of encoding and the TS multiplexing is performed at the same rate as the rate determined at the time of encoding. For example, if the video ES, the audio ES and the data ES are generated at 10 M bit/second, 1M bit/second and 1M bit/second, respectively, the rate of the TS after the multiplexing will be 12 Mbit/second and the control must be performed such that each ES occupies a portion of the TS at the ratio of 10:1:1. If the maximum transfer amount per a unit time of memory controlling unit 8 is set as to correspond to the rate determined at the time of encoding, the TS can be allocated in the ratio as described above when controller 1 refers to the state of each of ES buffers 2~4 and transfers the filled data of media to output buffer 7.

In addition, as the data transfer from each of ES buffers 2~4 or header information memory 5 to output buffer 7 is controlled according to the values set in the registers of transfer controlling unit 6 at the time of media multiplexing, the generation of any packet is allowed. Further, as controller 1 sets each of the read start address and the read end address for the data transfer from ES buffers 2~4 to output buffer 7, a portion of ES data held in ES buffers 2~4 can be discarded. This function can be utilized to change the header information of each ES, for example, after the encoding.

Still further, as output controlling unit 10 supplies without fail the media multiplexed TS data or the TS data as the "null packet" as an output according to an external output request, the output according to the externally requested rate is allowed regardless of the state of output buffer 7. Hence, the multiplexed data can be output at a fixed rate. In the application to the communication where transfer amount is fixed, a device such as a buffer for rate smoothing can be eliminated.

A bit position of each bit field in internal registers of transfer controlling unit 6 and a bit width of the read address according to the first embodiment are shown only as an example and the same effect can be obtained with modification thereof.

Second Embodiment

Figure 9:
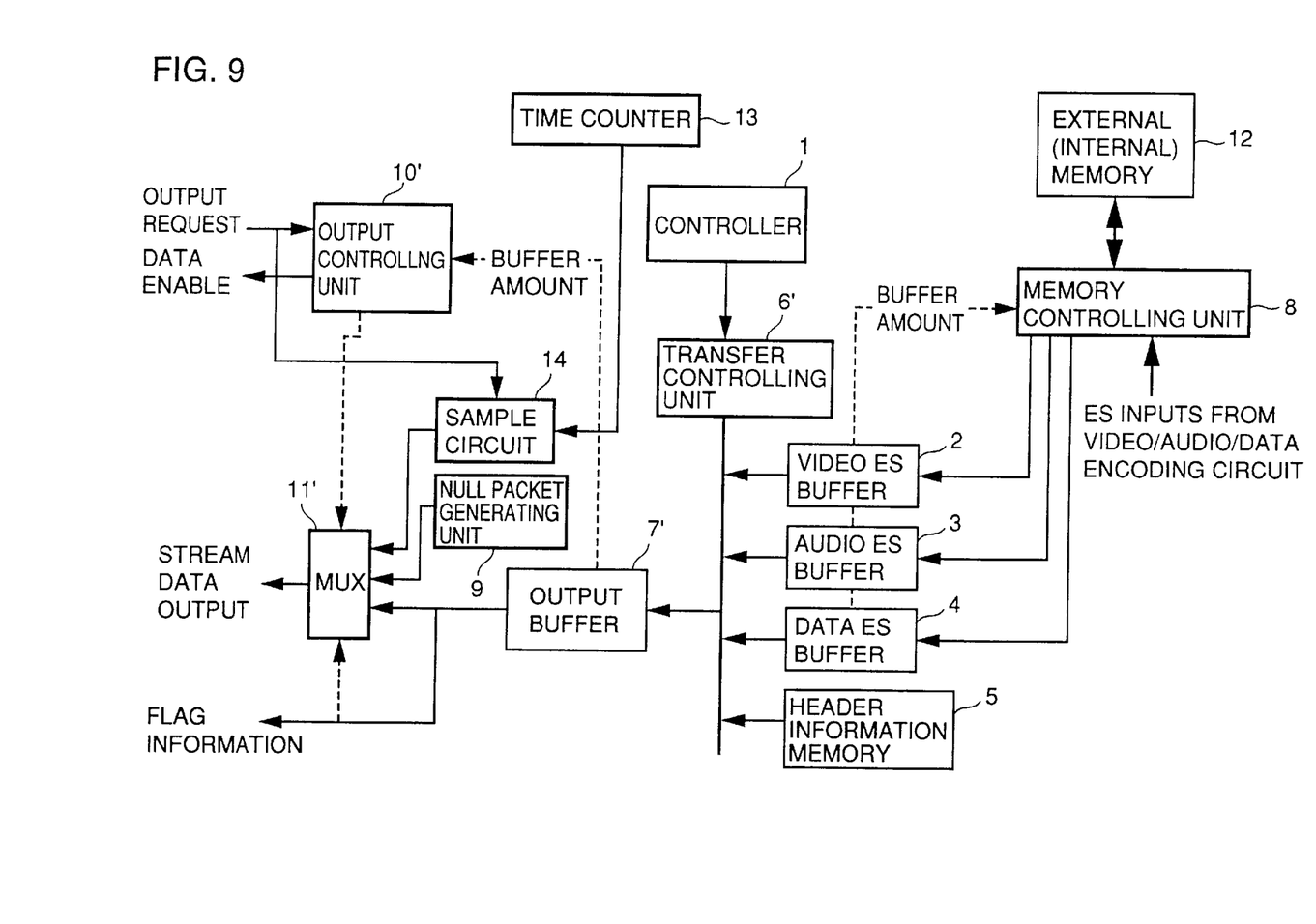
FIG. 9 is a block diagram showing a schematic structure of a data multiplexing device according to the second embodiment of the present invention.

FIG. 9 is a block diagram showing a schematic structure of a data multiplexing device according to the second embodiment of the present invention. Compared with the data multiplexing device according to the first embodiment shown in FIG. 4, a time counter 13 and a sample circuit 14 sampling a value counted by time counter 13 are added and the functions of the transfer controlling unit, the output buffer, the output controlling unit and the MUX are different. Hence, the detailed description of the same structure and function will not be repeated. In FIG. 9, the reference characters for the transfer controlling unit, the output buffer, the output controlling unit and the MUX are changed to 6', 7', 10' and 11', respectively.

Output buffer 7' is constituted such that it holds a flag bit in addition to data transferred from ES buffers 2~4 and header information memory 5. At the transfer of data from ES buffers 2~4 or header information memory 5 to output buffer 7', transfer controlling unit 6 outputs the flag bit in synchronization with the data. The flag bit is provided for showing a data boundary and includes a leading flag set at the head of the data, an ending flag set at the end of the data and a PCR flag set at the head of data of header memory 0.

FIG. 10 is referenced for describing contents of respective registers provided inside transfer controlling unit 6'. Compared with each register according to the first embodiment shown in FIG. 5, a leading flag, an ending flag and a PCR flag are provided to bits 22~24 of the header memory 0 transfer register, and a leading flag and an ending flag are provided to bits 22 and 23 of the header memory 1 transfer register, and a leading flag and an ending flag are provided to bits 22 and 23 of the ES buffer transfer register.

Figure 11:
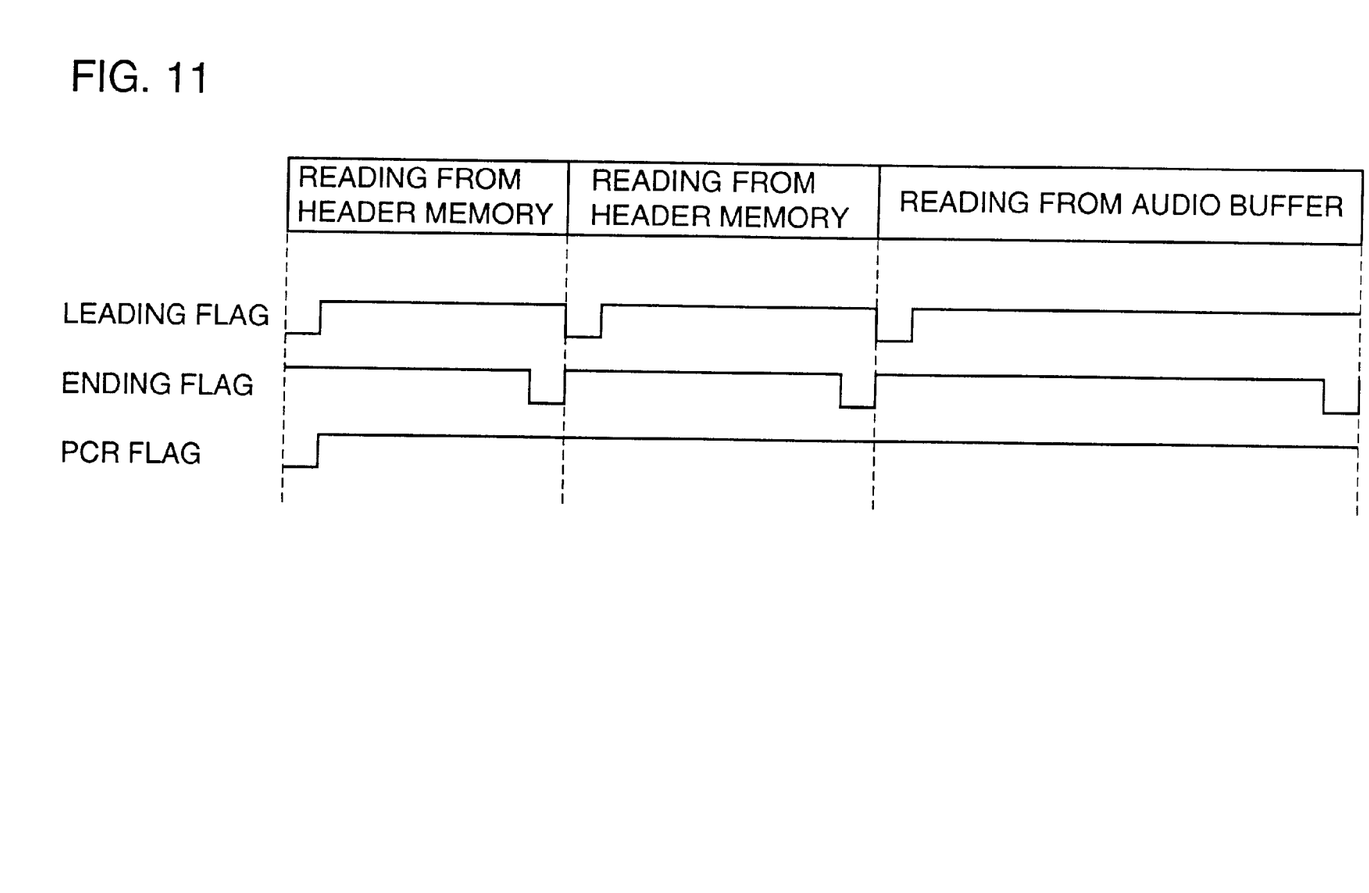
FIG. 11 is referenced for describing a transfer of data with each flag appended.

FIG. 11 is a diagram referenced for describing the transfer of data with each flag appended. When the bit field of the leading flag is set, transfer controlling unit 6' sets the leading flag (outputs a signal of a low level) at the time of transfer of data corresponding to the read start address. In addition, when the bit field of the ending flag is set, transfer controlling unit 6' sets the ending flag (outputs a signal of a low level) at the time of transfer of data corresponding to the read end address. In addition, when the bit field of the PCR flag is set, transfer controlling unit 6' sets the PCR flag (outputs a signal of a low level) at the time of transfer of data corresponding to the read start address of the header memory 1.

When output controlling unit 10' controls data output from output buffer 7' according to a received external request, a flag bit is supplied together from output buffer 7'. Sample circuit 14 samples a count value of time counter 13 on receiving the external output request. When detecting set PCR flag, output controlling unit 10' replaces the data in the PCR region in the TS header with a value sampled by sample circuit 14.

Figure 12:
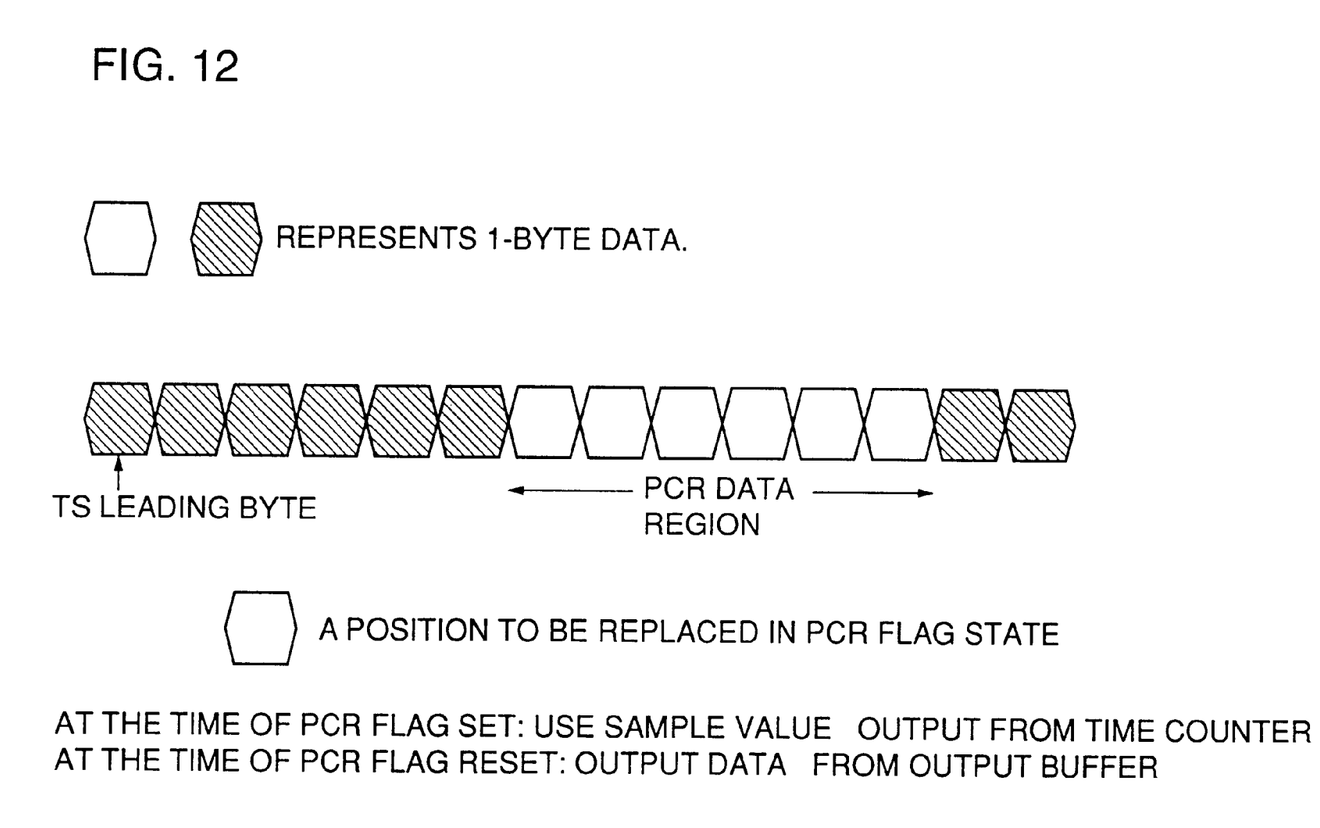
FIG. 12 is referenced for describing a position of a PCR region in a TS header.

FIG. 12 is a diagram referenced for describing a position of the PCR region in the TS header. The PCR region is always at a fixed position from the head of the TS header. Therefore, output controlling unit 10' can detect the position of the PCR region and replace the data in the PCR region by detecting the PCR flag. At the replacement of the data in PCR region, output controlling unit 10' supplies as an output a value sampled by sample circuit 14 by switching MUX 11'. Here a flag information indicating a data boundary is externally supplied as an output.

As described above, with the data multiplexing device according to the second embodiment, the flag bit is written together at the time of data transfer to output buffer 7', whereby the data boundary can be externally notified. For example, as the data boundary can be checked at the external circuit, remultiplexing of a plurality of TS's can be readily performed.

In addition, by the replacement of the PCR region with a value obtained by sample circuit 14, a time of the external output request can be correctly written. In addition, the calculation of the correct timing and the writing into the TS header based on the assumption of the reading timing is not required at the time of multiplexing, whereby the generation of the header information can be readily performed at the time of TS multiplexing.

Though the leading flag, the ending flag and the PCR flag are provided in the second embodiment as the flag information, other types of flag can be provided (such as a flag indicating an optional position of the TS packet). In addition, a bit position of each bit field and a bit width of the read address of the internal register of transfer controlling unit 6 are mere examples, and of course the same effect can be obtained with the modification thereof.

Third Embodiment

Figure 13:
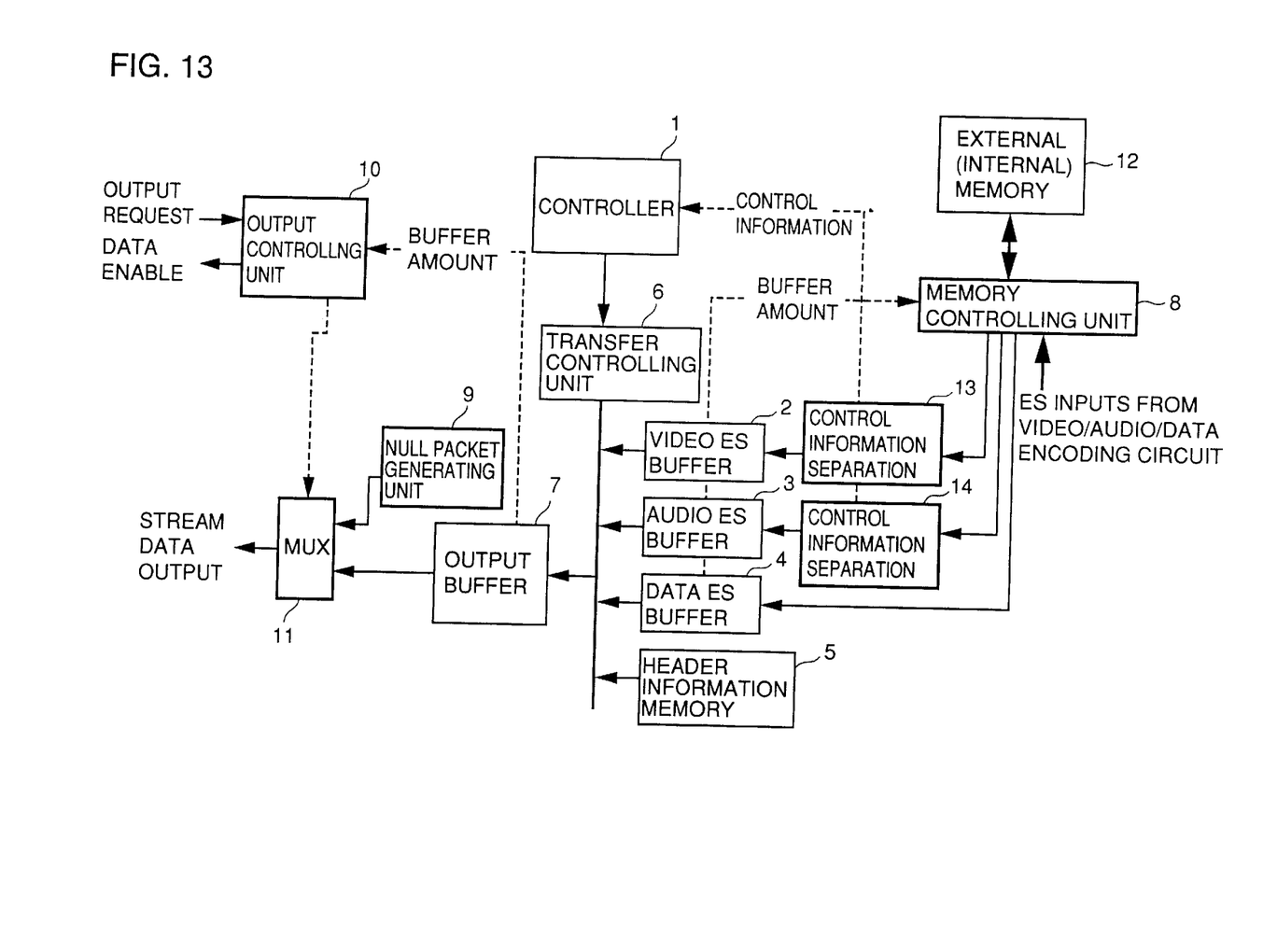
FIG. 13 is a block diagram showing a schematic structure of a data multiplexing device according to the third embodiment of the present invention.

FIG. 13 is a block diagram showing a schematic structure of a data multiplexing device according to the third embodiment of the present invention. Compared with the data multiplexing device according to the first embodiment shown in FIG. 4, a control information separating units 13 and 14 separating control information multiplexed by the encoding circuit are added. Hence the detailed description of the same structure and functions will not be repeated.

Figures 14A, 14B:
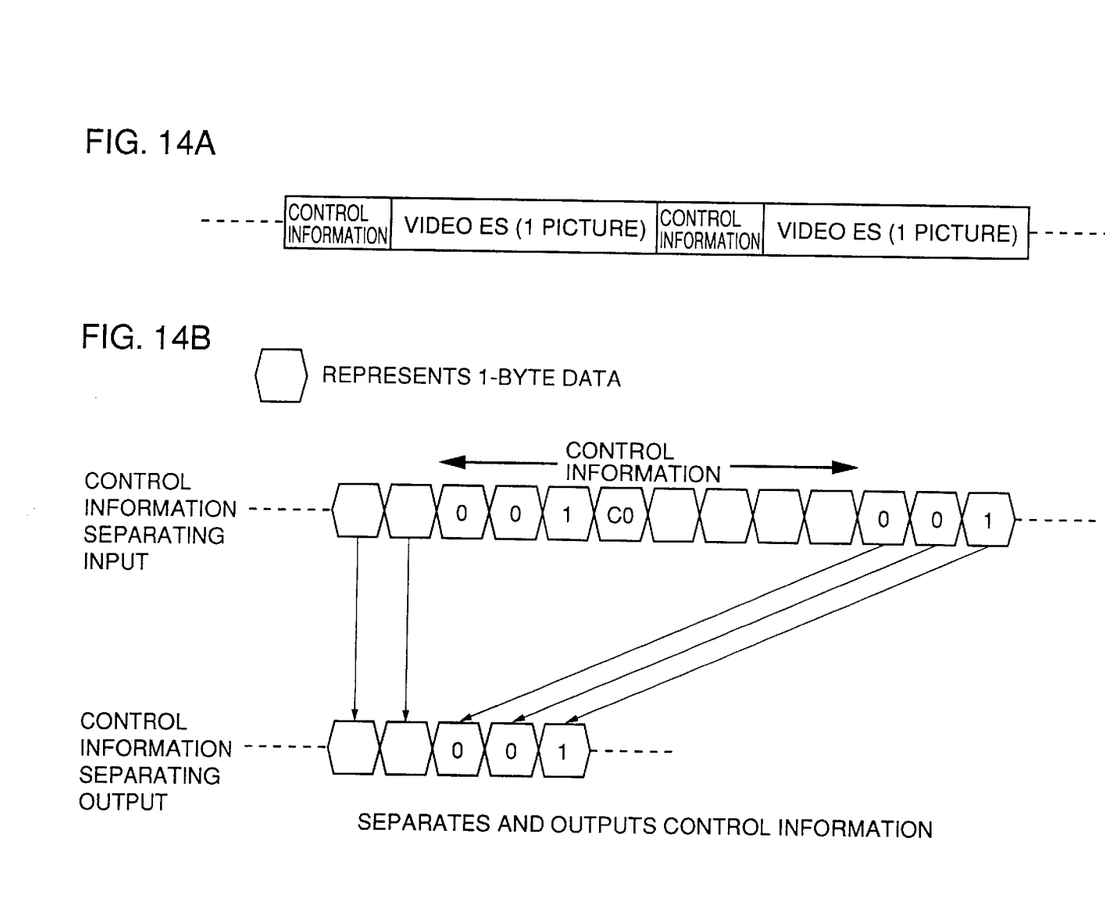
FIGS. 14A and 14B are referenced for describing control information of a video ES.

FIGS. 14A and 14B are diagrams referenced for describing the control information of the video ES. As to the video ES, the control information is multiplexed with the encoded data corresponding to an actual video and transferred together as shown in FIG. 14A. Usually, the control information of the video ES is multiplexed in a boundary of video ES of one picture and a unique word starting with "000001+8-byte code" is multiplexed at the head of the video ES. According to the syntax of the video ES of MPEG2, "000001+8-byte code" is treated as a "start code" and defined as a unique code which does not exist in the encoded data. A code reserved for the future expansion in the "start code" is utilized for the identification of the head of the control information.

A code to use and control data amount are determined between the encoding circuit and the data multiplexing device. Control information separating unit 13 separates the control information multiplexed at the encoding circuit and writes separated video ES data into video ES buffer 2. The control information and the ES boundary information separated by control information separating unit 13 are notified to controller 1.

Figure 15:
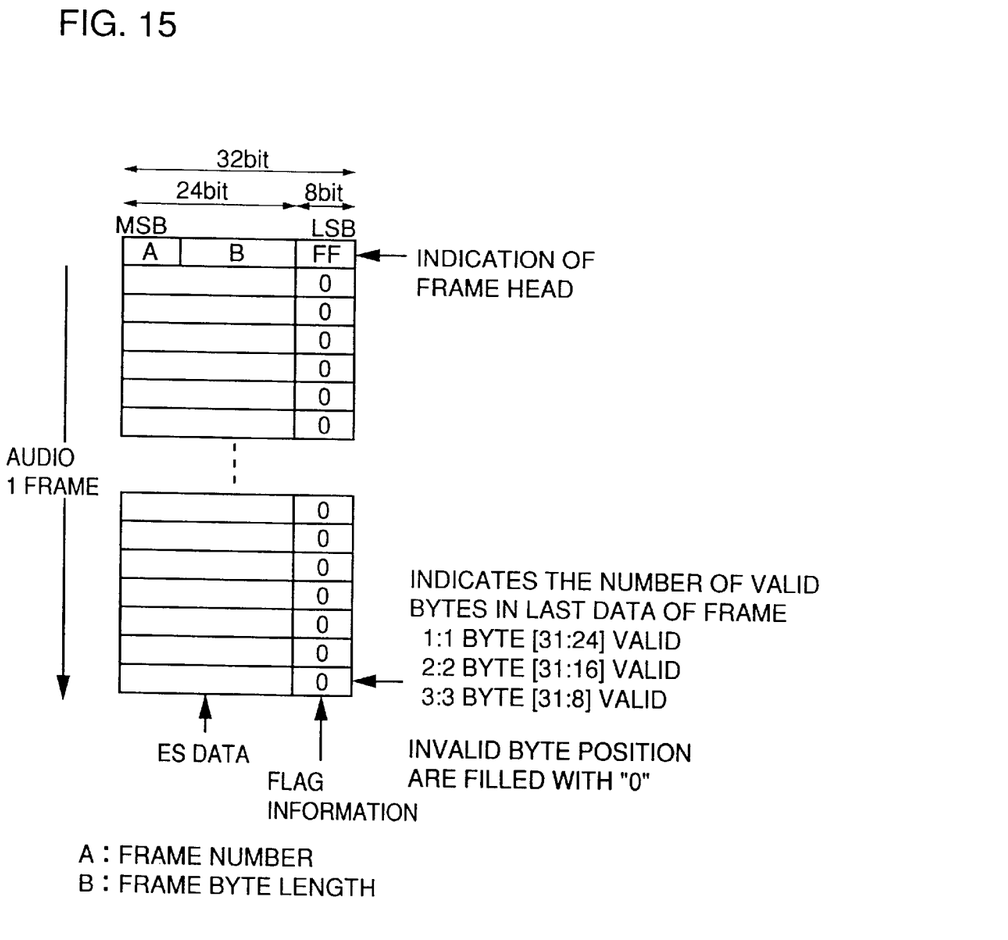
FIG. 15 is a diagram showing a structure of an audio ES on a frame basis.

The audio ES is transferred on a frame basis as a structure including the encoded data and appended flag information. As shown in FIG. 15, the audio ES data has a structure storing the audio ES data in the upper 3 bytes and the flag information in the lower one byte. The flag information indicates the type of data stored in the upper 3-byte data region. The flag information "FF" indicates the head of the audio frame and in this case, the control information is stored in the data region instead of audio ES. The leading ES data of the audio frame is transferred next to the data with flag information "FF". In this case the flag information is set to "0". Flag information included in the last data of the audio frame is set to "1", "2" or "3", indicating the number of valid bytes in the upper 3 bytes. A position of an invalid byte in the upper 3 bytes is filled with "0".

Control information separating unit 14 detects the flag information "FF", treats the upper 3 bytes thereof as the control information and outputs the control information to controller 1 together with ES boundary information. In addition, control information separating unit 14, after detecting the flag information "FF", detects next flag information "0" and identifies the uppermost byte of the upper 3 bytes thereof as the leading byte data of the audio frame. In addition, control information separating unit 14 separates the flag information of the audio ES data and evaluates the flag information and writes valid data of the upper 3 bytes sequentially into audio ES buffer 3.

As described above, by determining the controlling information between the encoding circuit and the data multiplexing device and transferring the control information from the encoding circuit to the data multiplexing device, controller 1 can readily perform header information generation and the flag generation at the time of multiplexing.

Here, in the second embodiment, "0001C0" code is used for multiplexing of the control information of the video ES as shown in FIG. 14B. Needless to say, the same effect can be obtained even when the amount of the control information to be multiplexed and the start code to be used are changed. In addition, even when the number of bits of the flag information or the number of bits of (valid data+flag information) in the frame-based packing structure of the audio ES is changed, the same effect can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data multiplexing device comprising:
a storing unit storing header information;
a first holding unit holding encoded data of a plurality of media;
a second holding unit holding packetized data; and
a transfer controlling unit controlling a transfer of the header information stored in said storing unit and the encoded data held in said first holding unit and writing into said second holding unit as said packetized data.

2. The data multiplexing device according to claim 1, further comprising a controlling unit programming control information controlling said transfer controlling unit.

3. The data multiplexing device according to claim 2, wherein
said transfer controlling unit includes
a first register designating an address of header information to be transferred stored in said storing unit, and
a second register designating an address of the encoded data to be transferred stored in said first holding unit and
said controlling unit programs said first register and said second register to control said transfer controlling unit.

4. The data multiplexing device according to claim 3, wherein said controlling unit controls said transfer controlling unit by referring to a free capacity of said second holding unit.

5. The data multiplexing device according to claim 1, further comprising, an input controlling unit inputting the encoded data of said plurality of media in a time divisional manner into said first holding unit.

6. The data multiplexing device according to claim 5, wherein said input controlling unit inputs the encoded data of said plurality of media in a time divisional manner into said first holding unit in a range not exceeding a predetermined maximum transfer amount per a unit time.

7. The data multiplexing device according to claim 6, wherein said input controlling unit inputs the encoded data of said plurality of media into said first holding unit while preventing an overflow of said first holding unit.

8. The data multiplexing device according to claim 1 further comprising an output controlling unit outputting data of a predetermined amount from said second holding unit according to a transfer request.

9. The data multiplexing device according to claim 8 further comprising
a fixed data output unit outputting fixed data, wherein
said output controlling unit refers to said second holding unit for amount of filled data, and makes said fixed data output unit output the fixed data when data of said predetermined amount does not exist in said second holding unit.

10. The data multiplexing device according to claim 8, wherein said output controlling unit multiplexes prepared data into an optional position of packetized data output from said second holding unit.

11. The data multiplexing device according to claim 10 further comprising a count unit counting a time wherein
said output controlling unit multiplexes the time counted by said count unit with packetized data output from said second holding unit.

12. The data multiplexing device according to claim 1 further comprising a flag appending unit appending a flag to data held by said second holding unit in an optional position, wherein
said second holding unit outputs flag information in synchronization with packetized data.

13. The data multiplexing device according to claim 12, wherein said flag appending unit appends the flag to a packet boundary of data held in said second holding unit.

14. The data multiplexing device according to claim 2 further comprising a separating unit separating the control information from the encoded data of the plurality of media.

15. The data multiplexing device according to claim 14, wherein said controlling unit controls said transfer controlling unit based on the control information separated by said separating unit.

* * * * *